United States Patent [19]

Hunt

[11] Patent Number: 4,795,783
[45] Date of Patent: Jan. 3, 1989

[54] ORGANOPOLYSILOXANE CONTAINING COATING COMPOSITIONS

[75] Inventor: Robin L. Hunt, Pittsburgh, Pa.

[73] Assignee: PPG Industries, Inc., Pittsburgh, Pa.

[21] Appl. No.: 63,931

[22] Filed: Jun. 19, 1987

[51] Int. Cl.[4] .............................................. C08F 8/00
[52] U.S. Cl. ...................................... 525/101; 525/58; 525/100; 428/447
[58] Field of Search ................ 525/100, 102, 479, 58, 525/101; 528/26

[56] References Cited

U.S. PATENT DOCUMENTS

| | | | |
|---|---|---|---|
| 3,451,838 | 6/1969 | Burzynski et al. | 117/33.3 |
| 3,460,980 | 8/1969 | Burzynski | 117/132 |
| 3,843,390 | 10/1974 | Hudson et al. | 117/138.8 F |
| 3,868,343 | 2/1975 | Stengle et al. | 260/29.4 R |
| 3,935,346 | 1/1976 | Stengle et al. | 427/385 |
| 4,043,953 | 8/1977 | Chang et an | 525/100 |
| 4,045,602 | 8/1977 | Sommer et al. | 427/386 |
| 4,093,673 | 6/1978 | Chang et al. | 260/824 EP |
| 4,103,065 | 7/1978 | Gagnon | 428/336 |
| 4,146,511 | 3/1979 | Moriya et al. | 260/3 |
| 4,172,904 | 10/1979 | Young et al. | 427/4 |
| 4,190,680 | 2/1980 | Young et al. | 427/4 |
| 4,224,211 | 9/1980 | Kanazawa et al. | 525/100 |
| 4,243,767 | 1/1981 | Kaufman et al. | 525/102 |
| 4,283,387 | 8/1981 | Young et al. | 424/78 |
| 4,284,685 | 8/1981 | Olson et al. | 428/331 |
| 4,298,632 | 11/1981 | Schroeter et al. | 427/160 |
| 4,301,268 | 11/1981 | Kropac | 528/26 |
| 4,306,050 | 12/1981 | Koerner et al. | 528/26 |
| 4,388,375 | 7/1982 | Hashimoto et al. | 428/412 |
| 4,500,337 | 2/1985 | Young et al. | 71/67 |
| 4,604,443 | 8/1986 | Chang et al. | 528/28 |
| 4,613,451 | 9/1986 | Chang et al. | 252/182 |
| 4,615,947 | 10/1986 | Goossens | 525/100 |
| 4,684,697 | 8/1987 | Chang et al. | 525/100 |

FOREIGN PATENT DOCUMENTS 58-122972 7/1983 Japan.

OTHER PUBLICATIONS

Dow Corning Bulletin, "Information About Silicone Protective Coating Resins", No. 03-302, Jul. 1967.

Primary Examiner—Wilbert J. Briggs, Sr.
Assistant Examiner—R. Dean, Jr.
Attorney, Agent, or Firm—Linda Pingitore

[57] ABSTRACT

A coating composition contains a blend of
(a) from about 5 percent by weight to about 35 percent by weight of a hydroxyl functional vinyl polymer having at least 2 percent by weight of hydroxyl groups based on the total weight of the vinyl polymer; and
(b) from about 65 percent by weight to about 95 percent by weight of an organopolysiloxane containing hydrolyzable groups prepared by the partial hydrolysis of a compound or mixture of compounds represented by the structural formula $R_aSiX_{(4-a)}$ wherein:
R is hydrogen, alkyl, aryl, alkylaryl, arylalkyl, aryloxyalkyl or haloalkyl;
X is halogen, $OR^1$,

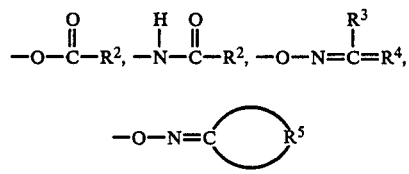

or the monohydroxy or cyclic $C_2$ to $C_3$ residue of a 1,2- or 1,3-glycol, wherein:
$R^1$ is $C_1$–$C_3$ alkyl,
$R^2$ is hydrogen or $C_1$–$C_4$ alkyl,
$R^3$ and $R^4$ independently are hydrogen, $C_1$–$C_4$ alkyl or $C_6$–$C_8$ aryl,
$R^5$ is $C_4$–$C_7$ alkylene, and
a is an integer ranging from 1 to 2, the percentage of (a) and (b) being based on the total weight of (a) and (b).

11 Claims, No Drawings

ORGANOPOLYSILOXANE CONTAINING COATING COMPOSITIONS

BACKGROUND OF THE INVENTION

The present invention relates to coating compositions based upon hydroxyl containing acrylic polymers and organopolysiloxanes.

U.S. Pat. No. 4,283,387 to Young et al is directed to a reversibly crosslinkable coating composition designed for the controlled release of bioactive agents, more particularly to the controlled release of pesticides. The coating composition comprises a mixture of a carbinol containing polymer, crosslinking agents for said polymer consisting essentially of a hydrolyzable silane or an organopolysiloxane containing hydrolyzable silane groups, and a hydrolyzable organic titanium compound and a pesticide. Since these coating compositions are reversibly crosslinked, the crosslinking is capable of breaking down to release the bioactive agent. Moreover, the amount of organopolysiloxane and carbinol containing polymer is such that the organopolysiloxane is present in relatively small amounts as compared to the carbinol containing polymer.

U.S. Pat. No. 4,103,065 to Gagnon is directed to improved coating compositions for polycarbonate or acrylic articles. The improvement in the composition of the Gagnon invention resides in the addition of constituent (c) to constituents (a) and (b) which are organopolysiloxane partial condensate product resin and an alkylated melamine formaldehyde partial condensate resin, respectively. The additional constituent (c) is a composition containing specified percentages of linear diol, thermosetting acrylic and crosslinking agent. The Gagnon composition specifically requires that the thermosetting acrylic contain from about 4 to about 10 percent by weight of the acrylic of a hydroxyalkyl ester of an alpha,beta-unsaturated carboxylic acid.

The art recognized compositions such as those of Gagnon which have been detailed above have been deficient in that they have been unable to provide the proper balance of flexibility and durability. Coating compositions based predominantly upon the type of polysiloxanes which are detailed in Gagnon tend to be much too brittle. Attempts to flexibilize these compositions has tended to make them less brittle, although not as durable as might be desired.

In contrast to the above, the coating compositions provided by the present invention show unexpected advantages both in flexibility and durability.

SUMMARY OF THE INVENTION

In accordance with the present invention, there is provided a coating composition comprising a blend of:
(a) from about 5 percent by weight to about 35 percent by weight of a hydroxyl functional vinyl polymer having at least 2 percent by weight of hydroxyl groups based on the total weight of the vinyl polymer; and (b) from about 65 percent by weight to about 95 percent by weight of an organopolysiloxane containing hydrolyzable groups prepared by the partial hydrolysis of a compound or mixture of compounds represented by the structural formula $R_aSiX_{(4-a)}$ wherein:
R is hydrogen, alkyl, aryl, alkylaryl, arylalkyl, aryloxyalkyl or haloalkyl;
X is halogen, $OR^1$,

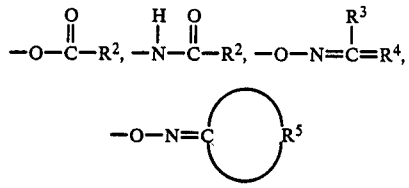

or the monohydroxy or cyclic $C_2$ to $C_3$ residue of a 1,2- or 1,3-glycol, wherein:
$R^1$ is $C_1$-$C_3$ alkyl,
$R^2$ is hydrogen or $C_1$-$C_4$ alkyl,
$R^3$ and $R^4$ independently are hydrogen, $C_1$-$C_4$ alkyl or $C_6$-$C_8$ aryl,
$R^5$ is $C_4$-$C_7$ alkylene, and
a is an integer ranging from 1 to 2,
the percentage of (a) and (b) being based on the total weight of (a) and (b).

Also provided in accordance with the present invention is a method of providing a substrate with a protective coating, comprising:
I. applying to the surface of a substrate a coating composition comprising a blend of
(a) from about 5 percent by weight to about 35 percent by weight of a hydroxyl functional vinyl polymer having at least 2 percent by weight of hydroxyl groups based on the total weight of the vinyl polymer; and
(b) from about 65 percent by weight to about 95 percent by weight of an organopolysiloxane containing hydrolyzable groups prepared by the partial hydrolysis of a compound or mixture of compounds represented by the structural formula $R_aSiX_{(4-a)}$ wherein:
R is hydrogen, alkyl, aryl, alkylaryl, arylalkyl, aryloxyalkyl or haloalkyl;
X is halogen, $OR^1$,

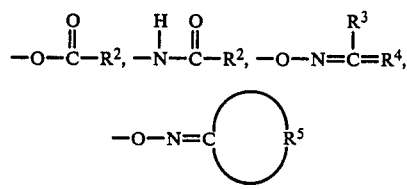

or the monohydroxy or cyclic $C_2$ to $C_3$ residue of a 1,2- or 1,3-glycol, wherein:
$R^1$ is $C_1$-$C_3$ alkyl,
$R^2$ is hydrogen or $C_1$-$C_4$ alkyl,
$R^3$ and $R^4$ independently are hydrogen, $C_1$-$C_4$ alkyl or $C_6$-$C_8$ aryl,
$R^5$ is $C_4$-$C_7$ alkylene, and
a is an integer ranging from 1 to 2,
the percentage of (a) and (b) being based on the total weight of (a) and (b);
II. at least partially curing the coating composition of step (I).

There is also provided a coated article prepared in accordance with the aforesaid method.

DETAILED DESCRIPTION OF THE INVENTION

The coating compositions of the present invention comprise a blend of two principle constituents. The first component is a hydroxyl functional vinyl polymer having at least 2 percent by weight of hydroxyl groups based on the total weight of the vinyl polymer. Preferably the vinyl polymer contains from about 2.5 percent by weight to about 15 percent by weight of hydroxyl groups based on the total weight of the vinyl polymer. The vinyl polymer is present in the coating composition in an amount ranging from about 5 percent by weight to about 35 percent by weight, preferably from about 5 percent by weight to about 20 percent by weight. The percentage of the hydroxyl functional vinyl polymer in the coating composition is based on the total weight of the hydroxyl functional vinyl polymer and the organopolysiloxane component which is described below.

A very important aspect of the claimed invention is the hydroxyl content of the vinyl polymer component of the coating composition. As has been stated above, the vinyl polymer contains at least 2 percent by weight of hydroxyl groups based on the total weight of the vinyl polymer. This is very important in providing the requisite flexibility of the claimed coating compositions. The percent by weight of hydroxyl groups contained in the vinyl polymer can be determined by dividing the gram molecular weight of a hydroxyl group (17 grams) by the hydroxyl equivalent weight of the vinyl polymer.

In an embodiment wherein the hydroxyl functional vinyl polymer is a hydroxyl functional acrylic polymer the percent by weight of hydroxyl groups based on the total weight of the acrylic polymer can be correlated to the amount, in percent, of hydroxyl functional vinyl monomer which is used in the preparation of the hydroxyl functional acrylic polymer. If one speaks in terms of the amount of hydroxyl functional vinyl monomer utilized in the preparation of a hydroxyl functional acrylic polymer, the vinyl monomer component should comprise at least 20 percent by weight, based on the total weight of the vinyl monomer component, of a hydroxyalkyl acrylate or methacrylate. Preferably the vinyl monomer component comprises from about 30 percent to about 40 percent by weight, based on the total weight of the vinyl monomer component, of a hydroxyalkyl acrylate or methacrylate. Coatings prepared from acrylic polymers having less than the required amount of hydroxyl functional vinyl monomer are too brittle for the applications contemplated by the present invention.

The hydroxyl functional vinyl polymer which is a principle component of the claimed coating compositions, can be of several types which can be prepared in a number of different ways. A preferred vinyl polymer for use in the present invention is a hydroxyl functional acrylic polymer or acrylic polyol.

Acrylic polyols include but are not limited to the known hydroxyl functional addition polymers and copolymers of acrylic and methacrylic acids and their ester derivatives including but not limited to their hydroxyl functional ester derivatives, acrylamide and methacrylamide, and unsaturated nitriles such as acrylonitrile and methacrylonitrile. Additional examples of acrylic monomers which can be addition polymerized to form acrylic polyols include hydroxyethyl(meth)acrylate, hydroxypropyl(meth)acrylate, methyl(meth)acrylate, ethyl(meth)acrylate, propyl(meth)acrylate, isopropyl(meth)acrylate butyl(meth)acrylate, t-butyl(meth)acrylate, 2-ethylhexyl(meth)acrylate, n-hexyl(meth)acrylate, cyclohexyl(meth)acrylate, 3,3,5-trimethylcyclohexyl(meth)acrylate, decyl(meth)acrylate, isodecyl(meth)acrylate, lauryl(meth)acrylate, stearyl(meth)acrylate, phenyl(meth)acrylate, and isobornyl(meth)acrylate.

Additional examples of compounds which may be employed in the preparation of hydroxyl functional acrylic polymers include: compounds produced by the reaction of lactones such as caprolactone with hydroxyl functional acrylic esters such as hydroxyethyl acrylate and hydroxyl propyl acrylate; and epoxy-esters produced by the reaction of fatty acids, especially monocarboxylic fatty acids, with ethylenically unsaturated epoxides such as glycidyl acrylate.

Where desired, various other unsaturated monomers can be employed in the preparation of hydroxyl functional acrylic polymers examples of which include: vinyl aromatic hydrocarbons such as styrene, alphamethyl styrene, and vinyl toluene; vinyl acetate; vinyl chloride; and unsaturated epoxy functional monomers such as glycidyl(meth)acrylate. For convenience, the term "(meth)acrylate" has been used herein to denote either or both of the respective acrylate compound and the respective methacrylate compound. Suitable acrylic polyols have number average molecular weights ranging from 500 to 100,000, preferably 1,000 to 20,000, more preferably 1,000 to 10,000 determined by gel permeation chromatography using a polystyrene standard. Moreover, suitable acrylic polyols of the invention have a hydroxyl equivalent weight of from 116 to 867.

In addition to the copolymerization of hydroxyl containing monomers including allyl alcohol, alloxy ethanol, and the like, a route to hydroxyl containing polymers includes the use of hydroxyl containing catalysts or catalysts convertible to hydroxyl groups.

The hydrolysis of poly(allyl acetate), poly(vinyl acetate), and copolymers of allyl acetate or vinyl acetate or other allyl or vinyl esters yields polymers with hydroxyl groups. Partial hydrolysis of these homopolymers or copolymers yields copolymers containing hydroxyl groups and residual unhydrolyzed functionality. The hydrolyzed polymers may be reacted with aldehydes such as formaldehyde, butyraldehyde, and benzaldehyde to yield formals and acetals containing residual hydroxyl groups. Oxyalkylation of the hydrolyzed polymers yields crosslinkable hydroxyalkyl derivatives.

The above examples of hydroxyl functional vinyl polymers should be considered illustrative and not limiting of materials suitable for use in the present invention. As has been set forth above, the polymer should have at least 2 percent by weight of hydroxyl groups based on the total weight of the polymer.

The second principle constituent of the claimed coating compositions comprises an organopolysiloxane containing hydrolyzable groups. The organopolysiloxane is present in the claimed coating compositions in an amount ranging from about 65 percent by weight to about 95 percent by weight, the percentages based on the total weight of organopolysiloxane and hydroxyl functional vinyl polymer.

The organopolysiloxane is prepared by the hydrolysis or partial hydrolysis of an organosilane compound or mixture of compounds represented by the structural formula $R_aSiX_{(4-a)}$ wherein:

R is hydrogen, alkyl, aryl, alkylaryl, arylalkyl, aryloxyalkyl or haloalkyl;

X is halogen, $OR^1$,

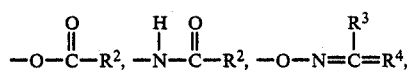

-continued

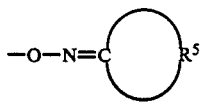

or the monohydroxy and/or cyclic $C_2$ to $C_3$ residue of a 1,2- or 1,3-glycol, wherein:
$R^1$ is $C_1$-$C_3$ alkyl,
$R^2$ is hydrogen or $C_1$-$C_4$ alkyl,
$R^3$ and $R^4$ independently are hydrogen, $C_1$-$C_4$ alkyl or $C_6$-$C_8$ aryl,
$R^5$ is $C_4$-$C_7$ alkylene, and
a is an integer ranging from 1 to 2.

Preferably the organopolysiloxane is prepared by the partial hydrolysis of a compound of the formula $CH_3Si(OR^1)_3$ wherein $R^1$ is $C_1$ to $C_3$ alkyl. This type of material is commercially available from Owen-Illinois as OI 650.

Exemplary of organosilane compounds which can be subjected to partial hydrolysis to prepare the organopolysiloxane include but are not limited to methyl trimethoxy silane, phenyl trimethoxy silane, dimethyl dimethoxy silane, methyl triethoxy silane, dimethyl diethoxy silane, dimethoxy diphenyl silane, dimethoxy methyl phenyl silane, diethoxy dipropyl silane, dimethoxy dipropyl silane, chloropropyltrimethoxysilane, and chloropropyltriethoxysilane.

The preparation of a partial hydrolysis product involves the use of a specific amount of water. Typically the hydrolysis product will be prepared utilizing a ratio of moles of organosilane to moles of water ranging from 1:0.4 to 1:3.0, preferably 1:1 to 1:3.0.

The organopolysiloxane comprises one or more siloxane linkages represented by the formula:

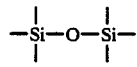

It should be understood that depending upon the ratio of organosilane to water and the reaction conditions the organopolysiloxane comprises a mixture of products that may include some low molecular weight compounds which contain residual easily hydrolyzable groups. The partial hydrolysis product is preferably free of such low molecular weight species; however, always will contain some residual easily hydrolyzable groups to permit crosslinking of the product through reaction with ambient moisture and/or reaction with hydroxyl groups of the aforedescribed hydroxyl functional vinyl polymers.

The hydrolysis of the compounds set forth above is conducted in the presence of a catalyst. Generally from about 0.0003 to about 20 percent by weight of the catalyst is utilized. Examples of suitable catalysts include gamma-aminopropyltriethoxy silane; isophorone diamine; 2-amino-2-methyl-1-propanol; protonic acids such as hydrochloric acid, formic acid, acetic acid, sulfuric acid; or various tin catalysts such as dibutylin dilaurate or the like. Preferably the acidic catalysts mentioned above are utilized. The percent by weight of catalyst is based upon the total weight of the material to be hydrolyzed.

It should be noted that the organopolysiloxane and hydroxyl functional vinyl polymer should be selected so that they are compatible. By "compatible" is meant that the two components mix freely to form a homogeneous mixture which does not separate upon standing. Moreover when the mixture of components is applied as a film and cured the cured film does not exhibit evidence of phase separation of the components such as excessive cratering or dewetting.

The coating compositions of the present invention are prepared by blending component (a) and component (b) together with mild agitation. By "blend" is meant that the components are simply mixed together prior to application and the coating composition is essentially free of any pre-reaction of the components. The coating compositions of the present invention can be prepared as a one-package or two-package composition. For the preparation of a two-package composition each of the components (a) and (b) is prepared separately and then introduced together immediately prior to use. The hydroxyl functional vinyl polymer is present in one package and the organopolysiloxane is present in a second package. It should be understood that other components can be present in the composition and can be added to either package as desired as is appreciated by those skilled in the art. When the claimed coating compositions are prepared as one-package compositions they are relatively package stable at ambient temperature for several months.

It should be noted that, if desired, other optional resinous ingredients can be added to the coating compositions of the present invention so long as they are compatible with the hydroxyl functional vinyl polymer and the organopolysiloxane and do not detract from the physical properties of the cured coating composition. For example, in one embodiment, the coating compositions can additionally contain an aminoplast crosslinking agent. These materials are described more fully below.

Aminoplast resins are based on the addition products of formaldehyde, with an amino- or amido-group carrying substance. Condensation products obtained from the reaction of alcohols and formaldehyde with melamine, urea or benzoguanamine are most common and preferred herein. These condensation products can be monomeric or polymeric. Condensation products of other amines and amides can also be employed, for example, aldehyde condensates of triazines, diazines, triazoles, guanadines, guanamines and alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammelin 2-chloro-4,6-diamino-1,3,5-triazine, 6-methyl-2,4-diamino-1,3,5-triazine, 3,5-diaminotrizole, triaminopyrimidine, 2-mercapto-4,6-diaminopyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers, of glycols such as CELLOSOLVES and CARBITOLS, and halogen-substituted or other substituted alcohols, such as 3-chloropropanol and butoxyethanol. The preferred aminoplast resins are substantially alkylated with methanol or butanol.

The coating compositions of the present invention can be pigmented or unpigmented and can be utilized in the presence of various generally known additives such as flow control agents, surfactants, leveling agents, fungicides, mildewcides and the like. Examples of pigments include any of the generally known pigments including extender pigments used in the coatings and resins industry such as mica, titanium dioxide, magnesium carbonate, talc, zinc oxide, magnesium oxide, iron oxides red and black, carbon black, metallic flake pigments such as aluminum flakes, and in addition organic pigments can also be utilized. Mixtures of pigments can also be employed.

The coating compositions of the present invention are typically formulated in an amount of organic solvent ranging from about 30 percent to about 60 percent. Examples of suitable solvents include alcohols, such as methanol, ethanol, butanol and the like; the mono- and di-alkyl ethers of ethylene and propylene glycol such as ethylene glycol monoethyl ether, ethylene glycol monobutyl ether, ethylene glycol dibutyl ether, ethylene glycol monoethyl ether acetate, and propylene glycol dibutyl ether; the mono- and di-alkyl ethers of diethylene glycol such as diethylene glycol monoethyl ether, diethylene glycol diethyl ether and diethylene glycol monobutyl ether acetate; ketones such as methylethyl ketone; esters such as butyl acetate; hydrocarbons such as xylene and toluene; N-methyl-2-pyrrolidone; and mixtures thereof.

The claimed coating compositions can be applied to a variety of substrates using any suitable technique such as brushing, dipping, spraying, roll coating and curtain coating.

In accordance with the present invention there is also provided a method of providing a substrate with a protective coating. The method comprises the steps of
I. applying to the surface of a substrate a coating composition comprising a blend of:
  (a) from about 5 percent by weight to about 35 percent by weight of a hydroxyl functional vinyl polymer having at least 2 percent by weight of hydroxyl groups based on the total weight of the vinyl polymer; and
  (b) from about 65 percent by weight to about 95 percent by weight of an organopolysiloxane containing hydrolyzable groups, the percentage of (a) and (b) being based on the total weight of (a) and (b);
II. at least partially curing the coating composition of step I.

Preferably the substrate utilized in the claimed method is a metal substrate. In one embodiment of the claimed method a metal substrate is primed with a suitable primer coating composition prior to application of the claimed coating composition which has been described above. The primer coating composition can be selected from a wide variety of available materials. One particularly suitable primer coating composition is a fluorocarbon based primer coating composition. This composition comprises broadly from about 10 percent to about 15 percent of a polyepoxide resin; from about 30 percent to about 45 percent of a thermoplastic acrylic resin; and from about 40 percent to about 55 percent of fluorocarbon polymer. This primer coating composition typically has a resin solids content of from about 15 percent to about 35 percent. This fluoropolymer based primer coating composition is described in detail in U.S. Pat. No. 4,379,885 to Miller et al, said patent being incorporated by reference herein. Another suitable primer coating composition for use in the claimed method is a polycarbonate based primer coating composition. These compositions are described in detail in U.S. patent application Ser. No. 887,455 filed July 21, 1986, now U.S. Pat. No. 4,692,382.

Substrates coated with the claimed coating composition prepared from a blend of hydroxyl functional vinyl polymer having at least 2 percent by weight of hydroxyl groups based on the total weight of vinyl polymer and organopolysiloxane are particularly advantageous. The compositions exhibit excellent package stability at ambient temperature for extended periods of up to 3 months. In addition, the coating compositions exhibit good flexibility as demonstrated by their impact resistance. Coating compositions which are formulated using organopolysiloxane alone or organopolysiloxane and a vinyl polymer which contains less than 2 percent by weight of hydroxyl groups based on the total weight of the polymer exhibit less flexibility upon impact as demonstrated by delamination of the coating from the substrate. The coating compositions of the present invention which contain at least 2 percent by weight of hydroxyl groups based on the total weight of vinyl polymer are more flexible and hence perform better during impact testing since they do not delaminate from the substrate. This result is particularly pronounced in coating compositions which have been aged or overbaked. The testing set out in the working examples illustrates this point.

The coating compositions of the present invention also exhibit outstanding durability as evidenced by good gloss retention after accelerated weathering tests. This result is supported by data from exposure in Florida of panels prepared from the same compositions. The panels on Florida exposure have also demonstrated outstanding results.

The coating compositions of the present invention are capable of curing by moisture cure of the hydrolyzable groups on the organopolysiloxane and also by crosslinking of the hydroxyl groups on the vinyl polymer with the hydrolyzable groups on the organopolysiloxane. The claimed coating compositions can be cured at ambient temperature with an appropriate catalyst or at bake temperatures of less than 500° F. (260° C.).

Examples of suitable catalysts for ambient temperature cure include those listed above for the preparation of the organopolysiloxane as well as zinc acetate, stannous octoate, and various other titanate and zirconate catalysts. The specific amount of catalyst can vary widely depending upon the nature of the catalyst.

Preferably the coating compositions of the present invention are cured by baking at temperatures ranging from 350° F. to 450° F. (177° C. to 232° C.) for 10 to 30 minutes.

The following examples are intended as being illustrative of the invention and are not intended to be limiting.

EXAMPLES 1 TO 7

Several white, pigmented coating compositions according to the present invention were formulated utilizing acrylic polymers which were prepared using different levels of hydroxyl function vinyl monomer. The coating composition were evaluated for physical properties to show the effect on cured film properties of increasing the level of hydroxyl functional vinyl monomer in the acrylic polymer. These examples illustrate the importance of the amount of hydroxyl functionality in the vinyl polymer.

| Ingredients | Coating Compositions (percent by weight) | | | | | | |
|---|---|---|---|---|---|---|---|
| | 1 | 2 | 3 | 4 | 5 | 6 | 7 |
| organopolysiloxane(a) | 82.86 | 82.86 | 82.86 | 82.86 | 82.86 | 82.86 | 82.86 |
| acrylic composition - 1(b) | 17.14 | | | | | | |
| acrylic composition - 2(c) | | 17.14 | | | | | |
| acrylic composition - 3(d) | | | 17.14 | | | | |
| acrylic composition - 4(e) | | | | 17.14 | | | |
| acrylic composition - 5(f) | | | | | 17.14 | | |
| acrylic composition - 6(g) | | | | | | 17.14 | |
| acrylic composition - 7(h) | | | | | | | 17.14 |
| percent hydroxyl functional monomer in acrylic | 5% | 10% | 20% | 30% | 40% | 50% | 40% and no acid |

(a)The organopolysiloxane composition was prepared in the following manner:

| Ingredients | Parts by Weight (grams) |
|---|---|
| OI 650(i) | 100.0 |
| methyl isoamyl ketone | 41.91 |
| methyl isobutyl ketone | 33.26 |
| ethyl alcohol | 24.83 |

(i)This organopolysiloxane is commercially available from Owens-Illinois, Inc.

The ingredients were combined with mild agitation to yield a clear solution.

(b)This acrylic composition was prepared in the following manner:

| | Ingredients | Parts by Weight (pounds) |
|---|---|---|
| grind paste: | grind vehicle(ii) | 211.60 |
| | acrylic-b(iii) | 148.18 |
| | bentone clay | 20.90 |
| | ethyl alcohol | 14.82 |
| | methyl isoamyl ketone | 59.27 |
| | titanium dioxide | 1111.36 |
| | acrylic - b | 63.72 |
| | methyl isoamyl ketone | 14.82 |

(ii)The grind vehicle was an acrylic resin prepared from 66 percent isobornyl methacrylate, 28 percent methyl methacrylate, 2.5 percent hydroxyethyl acrylate, 2.5 percent acrylic acid and 1 percent dimethyl aminoethyl methacrylate.
(iii)This acrylic resin was prepared from 5 percent hydroxypropyl acrylate, 30.5 percent butyl methacrylate, 31 percent butyl acrylate, 31 percent styrene, 2 percent acrylic acid and 0.5 percent methyl methacrylate.

The acrylic composition was prepared by first preparing the grind paste in the following manner. The grind vehicle and acrylic-b were charged to the tank of a suitable grind mill and the bentone was sifted in while mixing the charged ingredients. The entire mixture was then mixed at high speed for five minutes followed by the addition of the ethyl alcohol. Once again the reaction mixture was mixed at high speed for five minutes. This step was followed by the addition of the methyl isoamyl ketone and titanium dioxide. The pigment was dispersed in the mill to a Hegman grind of 7.5. The resultant grind paste was mixed with the second portion of acrylic-b and the composition washed out of the mill with the methyl isoamyl ketone. The composition was ready for use.

(c) This acrylic composition was prepared in the same manner and using the same amounts of ingredients as detailed for composition (b) with the exception that acrylic-c was used in place of acrylic-b wherever utilized. The acrylic-c was prepared from 10 percent hydroxypropyl acrylate, 28.5 percent butyl methacrylate, 29 percent butyl acrylate, 30 percent styrene, 2 percent acrylic acid and 0.5 percent methyl methacrylate.

(d) This acrylic composition was prepared in the same manner and using the same ingredients as detailed for composition (b) except that acrylic-d was used in place of acrylic-b wherever utilized. The acrylic-d was prepared from 20 percent hydroxypropyl acrylate, 25.5 percent butyl methacrylate, 26 percent butyl acrylate, 26 percent styrene, 2 percent acrylic acid and 0.5 percent methyl methacrylate.

(e) This acrylic composition was prepared in the same manner and using the same amounts of ingredients as detailed for composition (b) except that acrylic-e was used in place of acrylic-b wherever utilized. Acrylic-e was prepared from 30 percent hydroxypropyl acrylate, 21.5 percent butyl methacrylate, 22 percent butyl acrylate, 24 percent styrene, 2 percent acrylic acid and 0.5 percent methyl methacrylate.

(f) This acrylic composition was prepared in the same manner and using the same amounts of ingredients as detailed for composition (b) except that acrylic-f was used in place of acrylic-b wherever utilized. Acrylic-f was prepared from 40 percent hydroxypropyl acrylate, 18.5 percent butyl methacrylate, 19 percent butyl acrylate, 20 percent styrene, 2 percent acrylic acid and 0.5 percent methyl methacrylate.

(g) This acrylic composition was prepared in the same manner and using the same ingredients as acrylic-b except that acrylic-g was used in place of acrylic-b wherever utilized. Acrylic-g was prepared from 50 percent hydroxylpropyl acrylate, 15.5 percent butyl methacrylate, 16 percent butyl acrylate, 16 percent styrene, 2 percent acrylic acid, and 0.5 percent methyl methacrylate.

(h) This acrylic composition was prepared in the same manner and using the same ingredients as acrylic-b except that acrylic-h was used in place of acrylic-b wherever utilized. Acrylic-h was prepared from 40 percent hydroxypropyl acrylate, 18.5 percent butyl methacrylate, 21 percent butyl acrylate, 20 percent styrene, 0 percent acrylic acid and 0.5 percent methyl methacrylate.

Each coating composition was prepared by combining the organopolysiloxane and the acrylic composition with agitation. Each composition was spray applied onto a pretreated aluminum panel (commercially available from AMCHEM as AMCHEM TM 407/47). The coated panels were baked for 15 minutes at 400° F. (204° C.).

The panels were evaluated to determine the flexibility of each coating. The panels were impacted with 20, 40 and 60 inch pounds, direct and reverse, according to AAMA 605.2 section 7.5.1. The impact testing was done initially after the panels were cured and the results recorded. Each of the liquid coating compositions was also aged for 5 days and 10 days and fresh panels were sprayed and tested in the same manner. The panels were rated by observing all six impact sites present on each panel (20, 40, 60 inch pounds, direct and reverse) and the group of sites given one rating from best (1) to worst (7) for the amount of cracking and pick-off of the coating from the substrate. The rating scale was as follows:

```
1 - no cracking to slight cracking with pick-off.
↓   increasing amount of pick-off of coating from
↓   substrate.
7 - complete delamination of coating.
```

The results are tabulated below:

| Amount of Hydroxyl Functional Monomer (percent) | RATING | | |
|---|---|---|---|
| | Initial | 5 Days | 10 Days |
| 5 | 2 | 7 | 7 |
| 10 | 3 | 4 | 4 |
| 20 | 1 | 5 | 6 |
| 30 | 5 | 6 | 5 |
| 40 | 6 | 3 | 1 |
| 50 | 7 | 1 | 2 |
| 40 (no acid) | 4 | 2 | 3 |

Although the initial evaluation indicates the composition of lower hydroxyl functionality to be more flexible, evaluation of the aged compositions containing greater than 2 percent hydroxyl groups based on the total weight of the acrylic resin (the acrylic was prepared from at least 20 percent hydroxyl functional vinyl monomer) indicates that these exhibit better flexibility and do not delaminate upon impact.

Moreover, the coating compositions of the present invention exhibit good durability as evidenced by the very good gloss retention after accelerated weathering testing. Panels coated with coating composition 5 detailed above (utilized acrylic 5 detailed in footnote f) were subjected to accelerated weathering testing in a QUV apparatus for 1000 hours. The coating was subjected to alternating cycles of humidity (4 hours at 50° C.) and light (8 hours at 70° C.) and then evaluated for 60° gloss. Gloss retention was calculated as follows:

$$\frac{\text{Retained gloss}}{\text{Initial gloss}} \times 100\%$$

The coating had a gloss retention of 84 percent after 1000 hours.

EXAMPLE 8

This Example illustrates the preparation of a clear coating composition according to the present invention utilizing a different hydroxyl functional vinyl polymer than was utilized in Examples 1 to 7, above.

| Ingredients | Parts by Weight (grams) |
|---|---|
| organopolysiloxane$^{(j)}$ | 5.0 |
| vinyl polymer$^{(k)}$ | 13.0 |

$^{(j)}$The organopolysiloxane composition was prepared in the following manner:

| Ingredients | Parts by Weight (grams) |
|---|---|
| OI 650 | 50.0 |
| methyl isobutyl ketone | 50.0 |

The ingredients were combined with mild agitation to yield a clear solution.

$^{(k)}$This hydroxyl functional vinyl polymer is commercially available from Union Carbide as UCAR ® solution vinyl VYES. This polymer had 3.0 percent by weight of hydroxyl groups based on the total weight of the polymer The clear coating composition was prepared by combining the ingredients with mild agitation. The coating composition was drawn down on a glass panel using a number 50 wirewound drawbar. The coated panel was flashed for 10 minutes and baked for 10 minutes at 425° F. (218° C.). The resultant cured film was clear.

The same coating composition was also applied onto an aluminum panel with a number 50 drawbar and baked for 15 minutes at 400° F. (204° C.). The cured film was impacted as has been detailed above in Examples 1-7 using 20, 40 and 60 inch pounds, direct and reverse impact. The cured coating passed 60 inch pounds direct and 60 inch pounds reverse impact.

EXAMPLE 9

This Example also illustrates the importance of the level of hydroxyl functionality in the vinyl polymer. In this Example two coating compositions were compared for flexibility. One composition (A) utilized an acrylic polymer having about 0.4 percent by weight of hydroxyl groups based on the total weight of the polymer (the acrylic was prepared using 2.5 percent of hydroxyl functional vinyl monomer) and the other composition (B) utilized an acrylic polymer having about 5 percent by weight of hydroxyl groups based on the total weight of the polymer (the acrylic was prepared using 40 percent of hydroxyl functional vinyl monomer).

Composition A

| Ingredients | Parts by Weight (grams) |
|---|---|
| organopolysiloxane$^{(l)}$ | 100.0 |
| acrylic composition$^{(m)}$ | 40.1 |
| surfactant$^{(n)}$ | 0.1 |

$^{(l)}$The organopolysiloxane composition was prepared in the following manner:

| Ingredients | Parts by Weight (grams) |
|---|---|
| OI 650 | 50.0 |
| propylene glycol monomethyl ether acetate | 50.0 |

The ingredients were combined with mild agitation to yield a clear solution.

$^{(m)}$This acrylic composition was prepared in the following manner:

| Ingredients | Parts by Weight (grams) |
|---|---|
| grind vehicle of footnote (ii) | 97.20 |
| titanium dioxide | 100.01 |
| polyethylene wax$^{(iv)}$ | 2.80 |
| ethanol | 1.67 |
| PROPASOL B$^{(v)}$ | 93.71 |
| xylene | 4.61 |

$^{(iv)}$This suspension aid is commercially available from NL Industries.
$^{(v)}$This glycol ether is commercially available from Union Carbide. The ingredients were combined in a grind mill and ground to a Hegman grind of 7.0.
$^{(n)}$This surfactant is commercially available from 3M as FC 430.

The coating composition was prepared by combining the ingredients together with mild agitation.

| Composition B | |
|---|---|
| Ingredients | Parts by Weight (grams) |
| organopolysiloxane of footnote (l) | 165.72 |
| acrylic composition of footnote (m) | 71.43 |
| acrylic-f of footnote (f) | 14.3 |

The coating composition was prepared by combining the ingredients together with mild agitation.

Each one of the coating compositions A and B was spray applied onto aluminum panels and baked at two different temperatures, 10 minutes at 425° F. (218° C.) and 30 minutes at 400° F. (204° C.). The cured films were evaluated as described in Examples 1 to 7 for direct and reverse impact.

Coating composition (A) containing 0.4 percent by weight of hydroxyl groups only passed 20 inch pounds of direct impact after the 10 minute bake, completely failed the reverse impact test after this bake and completely failed both of the impact tests after the longer bake. Coating composition (B) containing the higher level of hydroxyl groups passed 60 inch pounds direct impact and 40 inch pounds reverse impact after the 10 minute bake and passed 40 inch pounds direct impact but failed reverse impact after the 30 minute bake. The purpose of the impact evaluation after the second bake was to test the flexibility of the coating composition under conditions which tend to increase brittleness. Overbaking like aging tends to increase brittleness. The impact test results demonstrate that the claimed coating compositions which are prepared from a vinyl polymer having at least 2 percent by weight of hydroxyl groups based on the total weight of the vinyl polymer exhibit outstanding flexibility even after overbake.

What is claimed is:

1. A coating composition comprising a blend of:
   (a) from about 5 percent by weight to about 35 percent by weight of a hydroxyl functional vinyl polymer having at least 2 percent by weight of hydroxyl groups based on the total weight of the vinyl polymer; and
   (b) from about 65 percent by weight to about 95 percent by weight of an organopolysiloxane containing hydrolyzable groups which is prepared by the partial hydrolysis of a compound or mixture of compounds selected form the group consisting of silanes represented by the structural formula $R_a\text{-}SiX_{(4-a)}$ wherein:
   R is hydrogen, alkyl, aryl, alkylaryl, arylalkyl, aryloxyalkyl or haloalkyl;
   X is halogen, $OR^1$,

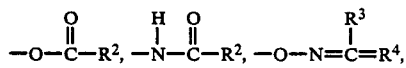

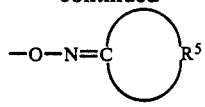

or the monohydroxy or cyclic $C_2$ to $C_3$ residue of a 1,2- or 1,3-glycol, wherein:
   $R^1$ is $C_1$–$C_3$ alkyl,
   $R^2$ is hydrogen or $C_1$–$C_4$ alkyl,
   $R^3$ and $R^4$ independently are hydrogen, $C_1$–$C_4$ alkyl or $C_6$–$C_8$ aryl,
   $R^5$ is $C_4$–$C_7$ alkylene, and
   a is an integer ranging from 1 to 2, the percentage of (a) and (b) being based on the total weight of (a) and (b).

2. The coating composition of claim 1 wherein the organopolysiloxane is prepared by the partial hydrolysis of a compound of the formula $C_6H_5Si(OR')_3$ or a mixture of compounds of the formula $CH_3Si(OR')_3$ and $C_6H_5Si(OR')_3$ wherein R' is $C_1$ to $C_3$ alkyl.

3. The coating composition of claim 1 wherein the organopolysiloxane is prepared by the partial hydrolysis of a compound of the formula $CH_3Si(OR')_3$ wherein R' is $C_1$ to $C_3$ alkyl.

4. The coating composition of claim 1 wherein the organopolysiloxane comprises one or more siloxane linkages represented by the formula:

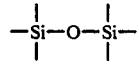

5. The coating composition of claim 1 wherein the vinyl polymer is an acrylic polymer which is prepared from a vinyl monomer component comprising at least about 20 percent by weight, based on the total weight of the vinyl monomer component, of a hydroxyalkyl acrylate or hydroxyalkyl methacrylate.

6. The coating composition of claim 5 wherein the vinyl monomer component comprises from about 30 percent to about 40 percent by weight, based on the total weight of the vinyl monomer component, of a hydroxyalkyl acrylate or hydroxyalkyl methacrylate.

7. The coating composition of claim 1 wherein the vinyl polymer contains from about 2.5 percent by weight to about 15 percent by weight of hydroxyl groups based on the total weight of the vinyl polymer.

8. The coating composition of claim 1 wherein the amount of component (a) ranges from about 5 percent by weight to about 20 percent by weight and the amount of component (b) ranges from about 80 percent by weight to about 95 percent by weight, the percentages of (a) and (b) being based on the total weight of (a) and (b).

9. The coating of claim 1 wherein the coating composition additionally comprises an aminoplast crosslinking agent.

10. The coating composition of claim 9 wherein the aminoplast crosslinking agent is a melamine formaldehyde condensate.

11. The coating composition of claim 1 additionally comprising a pigment.

* * * * *